US007881561B2

(12) United States Patent
Zuev et al.

(10) Patent No.: US 7,881,561 B2
(45) Date of Patent: Feb. 1, 2011

(54) METHOD OF PRE-ANALYSIS OF A MACHINE-READABLE FORM IMAGE

(75) Inventors: Konstantin Zuev, Moscow (RU); Irina Filimonova, Moscow (RU); Sergey Zlobin, Moscow (RU)

(73) Assignee: Abbyy Software Ltd., Nicosia (CY)

( * ) Notice: Subject to any disclaimer, the term of this patent is extended or adjusted under 35 U.S.C. 154(b) by 1001 days.

(21) Appl. No.: 10/603,215

(22) Filed: Jun. 26, 2003

(65) Prior Publication Data

US 2006/0274941 A1 Dec. 7, 2006

(30) Foreign Application Priority Data

Mar. 28, 2003 (RU) .......................... 2003108433 A

(51) Int. Cl.
G06K 9/36 (2006.01)
G06F 17/00 (2006.01)

(52) U.S. Cl. ...................................... 382/289; 715/221
(58) Field of Classification Search ......... 382/289–297; 715/221–226
See application file for complete search history.

(56) References Cited

U.S. PATENT DOCUMENTS

| 5,025,484 | A | * | 6/1991 | Yamanari et al. ........... 382/311 |
| 5,031,225 | A | * | 7/1991 | Tachikawa et al. .......... 382/185 |
| 5,150,424 | A | * | 9/1992 | Aguro et al. ................ 382/189 |
| 5,182,656 | A | * | 1/1993 | Chevion et al. ............. 358/452 |
| 5,191,525 | A | * | 3/1993 | LeBrun et al. .............. 715/229 |
| 5,235,651 | A | | 8/1993 | Nafarieh |
| 5,235,654 | A | * | 8/1993 | Anderson et al. ........... 382/180 |
| 5,257,328 | A | * | 10/1993 | Shimizu ..................... 382/311 |
| 5,305,396 | A | | 4/1994 | Betts et al. |
| 5,386,508 | A | | 1/1995 | Itonori et al. ............... 717/109 |
| 5,416,849 | A | * | 5/1995 | Huang ....................... 382/173 |
| 5,461,459 | A | * | 10/1995 | Muramatsu et al. ........... 399/15 |
| 5,471,549 | A | | 11/1995 | Kurosu et al. |
| 5,592,572 | A | | 1/1997 | Le |
| 5,642,443 | A | | 6/1997 | Goodwin et al. |
| 5,793,887 | A | * | 8/1998 | Zlotnick .................... 382/209 |
| 5,877,963 | A | | 3/1999 | Leung et al. |
| 5,903,668 | A | | 5/1999 | Beernink |
| 5,982,952 | A | | 11/1999 | Nakashima |
| 6,075,875 | A | | 6/2000 | Gu |
| 6,137,905 | A | | 10/2000 | Takaoka |
| 6,151,423 | A | | 11/2000 | Melen |
| 6,169,822 | B1 | | 1/2001 | Jung |
| 6,175,664 | B1 | | 1/2001 | Nakashima |

(Continued)

*Primary Examiner*—Aaron W Carter
(74) *Attorney, Agent, or Firm*—Hahn & Moodley LLP; Vani Moodley, Esq.

(57) ABSTRACT

The present invention relates generally to an optical character recognition of machine-readable forms, and in particular to a verification of a direction of spatial orientation and a definition of a form type of the document electronic image. The goals of the invention are achieved by preliminarily assigning one or more form objects as elements composing a graphic image unambiguously defining its direction of spatial orientation. Similarly, one or more form objects are preliminarily assigned as elements composing a graphic image unambiguously defining its type. The direction of spatial orientation and the type of the form are verified via identification of said images. The models of graphic images either for verification the direction of spatial orientation or for defining the form type are stored in a special data storage means, one of the embodiment of which is form model description.

11 Claims, 1 Drawing Sheet

U.S. PATENT DOCUMENTS

| | | |
|---|---|---|
| 6,285,802 B1 | 9/2001 | Dennis et al. |
| 6,574,375 B1 | 6/2003 | Cullen et al. |
| 6,636,649 B1 | 10/2003 | Murata et al. |
| 6,640,009 B2 * | 10/2003 | Zlotnick ............... 382/224 |
| 6,687,404 B1 * | 2/2004 | Hull et al. ............ 382/226 |
| 6,760,490 B1 * | 7/2004 | Zlotnick ............... 382/311 |
| 6,778,703 B1 * | 8/2004 | Zlotnick ............... 382/218 |
| 6,798,905 B1 * | 9/2004 | Sugiura et al. ......... 382/168 |
| 6,804,414 B1 | 10/2004 | Sakai et al. |
| 6,952,281 B1 * | 10/2005 | Irons et al. ............ 358/1.15 |
| 6,993,205 B1 | 1/2006 | Lorie et al. |
| 7,151,860 B1 | 12/2006 | Sakai et al. |
| 7,215,828 B2 | 5/2007 | Luo |
| 2002/0106128 A1 * | 8/2002 | Zlotnick ............... 382/224 |
| 2003/0197882 A1 * | 10/2003 | Tsukuba et al. ........ 358/1.12 |
| 2006/0104511 A1 * | 5/2006 | Guo et al. ............. 382/176 |
| 2009/0097071 A1 * | 4/2009 | Tsukuba et al. ........ 358/1.18 |

\* cited by examiner

METHOD OF PRE-ANALYSIS OF A MACHINE-READABLE FORM IMAGE

REFERENCES CITED U.S. PATENT DOCUMENTS

| 6169822 | Jan. 2, 2001 | Jung | 382/186 |
| --- | --- | --- | --- |
| 6148119 | Nov. 14, 2000 | Takaoka | 382/203 |
| 6137905 | Oct. 24, 2000 | Takaoka | 382/186 |
| 5592572 | Jan. 7, 1997 | Le | 382/190 |
| 5471549 | Nov. 28, 1995 | Kurosu et al. | 382/195 |
| 5235651 | Aug. 10, 1993 | Nafarieh | 382/202 |
| 5031225 | Jul. 09, 1991 | Tochikawa et al. | 382/203 |

REFERENCES CITED NON-PATENT DOCUMENTS

1. "Proceedings of the 13-th International Conference on Pattern Recognition, Aug. 25-29, 1996, Vienna, Austria". Vol. III, Track C, IEEE Computer Society Press, Los Alamitos, Calif., p. 681-685.
2. 1. "Proceedings of the 13-th International Conference on Pattern Recognition, Aug. 25-29, 1996, Vienna, Austria". Vol. III, Track C, IEEE Computer Society Press, Los Alamitos, Calif., p. 691-695.
3. "Proceedings of the 13-th International Conference on Pattern Recognition, Aug. 25-29, 1996, Vienna, Austria". Vol. III, Track C, IEEE Computer Society Press, Los Alamitos, Calif., p. 696-700.
4. "Proceedings of the 13-th International Conference on Pattern Recognition, Aug. 25-29, 1996, Vienna, Austria". Vol. III, Track C, IEEE Computer Society Press, Los Alamitos, Calif., p. 701-705.
5. "Proceedings of the 13-th International Conference on Pattern Recognition, Aug. 25-29, 1996, Vienna, Austria". Vol. III, Track C, IEEE Computer Society Press, Los Alamitos, Calif., p. 768-772.
6. "Proceedings of the 13-th International Conference on Pattern Recognition, Aug. 25-29, 1996, Vienna, Austria". Vol. III, Track C, IEEE Computer Society Press, Los Alamitos, Calif., p. 793-797.

BACKGROUND OF THE INVENTION

1. Field of the Invention

The present invention relates generally to an optical character pre-recognition of machine-readable forms, and in particular to bit-mapped image and one or more model matching methods, and also image spatial direction identification.

2. Prior Art

According to widely known methods of text pre-recognition a bit-mapped image is parsed into regions, containing text and/or non-text regions, with the further dividing said text regions into objects, containing strings, words, character groups, characters etc.

Some known methods uses preliminarily document type identification for narrowing a list of possible documents types, examined in an analysis of the document logical structure.

According to this group of methods the document type identification is an independent step of document analysis, forestalling logical structure identification. At that the document type and its properties list become defined up to the moment of defining the logical structure thereof. Or wise versa, a document structure identification may be an integral part of logical structure identification process. In this case the document type that fits closer the analyzed image is selected.

A spatial orientation direction verification is present in a number of documents.

In the U.S. Pat. No. 5,031,225 (Jul. 9, 1991, Tochikawa et al.) is disclosed a method of document image spatial orientation verification, using a preliminarily assigned character, to be found in the document. The found character is recognized to fit one of the 4 models thereof, corresponding with four possible directions.

The most reliably matching model indicates the orientation direction of the image.

The method causes a mistake in the case of possible different directions of text orientation to be present in the document. It also may cause mistake if the character is not reliably recognized after converting into image state.

In the U.S. Pat. No. 5,235,651 (Aug. 10, 1993, Nafarieh) the orientation direction of the image is estimated via setting up and accepting a hypothesis on the level of initial image units by analyzing the transition from dark points (pixels) and regions to light ones and wise versa. If the examined hypothesis is not accepted, the new one is set up, considering the image to be turned at 90° angle.

The method can't work if various orientation directions of text can be present on the form.

In the U.S. Pat. No. 5,471,549 (Nov. 28, 1995, Kurosu et al.) to define the image orientation direction the text characters are selected from the text one after another and are tried to recognize, supposing orientation direction to be 0°, 90°, 180°, 270°. The direction of the best matching is assumed as the right document image orientation.

The method can't work if various orientation directions of text can be present on the form as in the previous example.

In the U.S. Pat. No. 5,592,572 (Jan. 7, 1997, Le) the problem is solved by dividing the image into a large amount of objects, either of text or non-text types. Then the orientation of all initial objects is estimated via recognition of characters, with the further joining them into large ones and estimating the orientation thereof. Finally there is the only text object, covering the whole text field with the corresponding orientation estimation.

The main shortcoming of the method lies in that the orientation estimation is performed along with recognition of text portions, thus reducing the method output.

In the U.S. Pat. No. 6,137,905 (Oct. 24, 2000, Takaoka) and U.S. Pat. No. 6,148,119 (Nov. 14, 2000, Takaoka) the orientation direction is estimated by dividing the image into a plurality of regions, possessing various estimation weight coefficient. Then the orientation direction is estimated via the text recognition in the said regions. The total direction is estimated as a sum of particular ones together with their weight coefficients.

The shortcoming of the method is the low method output, depending greatly upon the recognition results.

In the U.S. Pat. No. 6,169,822 (Jan. 2, 2001, Jung) the predetermined portion of the text is parsed from the image and is performed (processed) recognition. In the case of recognition failure, the inference is made about the other orientation direction of the image.

To achieve the reliable result via the said method the large number of text portions are to be recognized. That surely reduces the method output.

SUMMARY OF THE INVENTION

One or more objects of the form are assigned thereon, composing graphic image, unambiguously defining its direction of spatial orientation. The said graphic image properties comprise a description of a special model for defining the direction of spatial orientation. Identification of the image with the said model the right direction of image spatial orientation is defined. The said model properties are stored in a special data storage means, one of the embodiment of which is the form image model description.

In the similar way one or more form objects are assigned thereon, composing graphic image, unambiguously defining its type. Additionally one or more form objects may be assigned, for the case of profound form type analysis, if two or more forms are close in appearance or in properties list. The graphic image properties comprise description of a special model for form type definition. The said model properties are stored in a special data storage means, one of the embodiment of which is a form model description.

After converting the form image is parsed into regions containing text images, data input fields, special reference points, lines and other objects.

The possible distortion, caused by the document conversion to electronic state, is eliminated from the image.

Objects, comprising the graphic image for spatial orientation verification, are identified on the form image. The orientation direction accuracy is verified and corrected if necessary.

The objects, comprising the graphic image for form type definition, are identified on the form image. The proper model is selected via identification of the said graphic image. In the case of multiple identification result, the profound analysis of the form type is performed. The profound analysis is performed in the similar way adding the supplementary objects to the graphic image and performing new identification.

The profound analysis is performed automatically or fully or partly manually.

DETAILED DESCRIPTION OF THE INVENTION

The document logical structure examination requires dividing the document image into elements of different types. The single element of the document can contain its title, authors name, date of the document or the main text etc.

The composition of the document elements depends upon its type.

The document logical structure is performed by the following ways:
- on the base of fixed elements location,
- using a table or multi-column structure
- on the base of structural images identification, via specialized methods for special documents types.

Methods of the first group requires fixed structural elements location and are used for fields mark out, i.e. image regions, containing elements for documents of standard form [2]. The exact elements location on the form may be distorted by scanning. The distortion may be of various kinds: shift, a small turn angle, a compression and stretching, a large turn angle.

All kinds of distortion are eliminated on the first stage of document image processing.

The coordinates of regions may be founded relatively to:
- image edges,
- special reference points,
- remarkable form elements,
- a correlation function, taking into account of all or a part of the listed above.

Sometimes, the distortion may be ignored due to its negligibility. Then the image coordinates are computed relatively to the image edges.

Figure 3:
FIG. 3 shows some examples of graphic objects used as assigned elements comprising graphic image.

The most of the methods for form type identification uses special graphic objects that are reliably identified reference points, as black squares or rectangles, a short dividing lines composing cross or corner (FIG. 3) etc. Searching the reference points location combination as an image using the special models, the type of the analyzed form can be correctly defined.

The main technical result of the invention consists in gaining
- universality of the pre-recognition analysis of machine-readable forms,
- ability to process documents' images of more then one form type in one session,
- ability to process documents images of different directions of spatial orientation,
- ability to perform the pre-recognition process with high output.

The said technical result is achieved in the following way.

Figure 1:
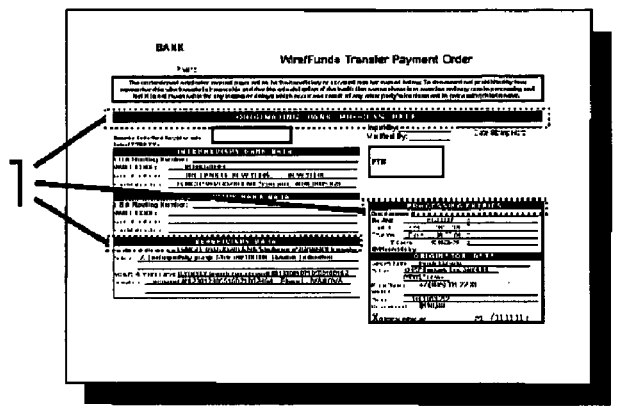
FIG. 1 shows a document with three assigned elements comprising graphic image.
Figure 2:
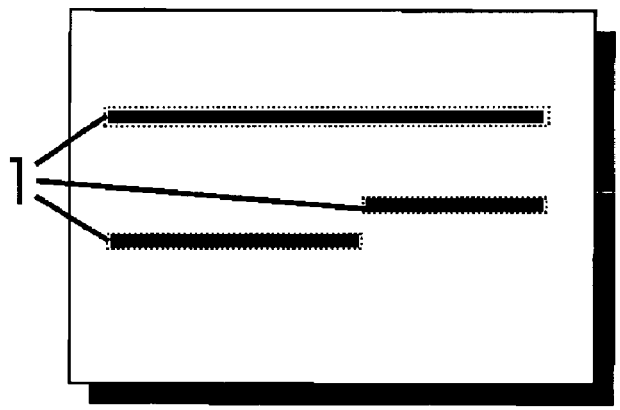
FIG. 2 shows the graphic image, formed by assigned elements.

Referring to FIG. 1 of the drawings, one or more objects (1) are assigned on the form. The thus assigned objects as shown in FIG. 2, comprise graphic images for unambiguously defining a direction of spatial orientation of the form. The said graphic image properties are described in a special model used for defining the direction of spatial orientation. Identification of the said image via the said model the right direction of image spatial orientation is defined. The said special model properties are stored in a special data storage means, one of the embodiments of which is the form image model description.

In similar way one or more form objects (1) are assigned so that the assigned form objects comprise graphic images as shown in FIG. 2 for unambiguously the form's type. Additionally one or more supplementary form objects may be assigned for profound form type analysis, if two or more forms are close in appearance or in properties list. The graphic image properties is described of an another special model used for form type definition. The said another special model properties are stored in a special data storage means, one of the embodiment of which is a form model description.

After converting to electronic state the form image is parsed into regions containing text objects images, data input fields, special reference points, lines and other objects.

The possible distortion, caused by the document conversion to electronic state, is eliminated from the image.

The objects, comprising the graphic image for spatial orientation verification, are identified on the form image. The orientation direction accuracy is verified and corrected if necessary.

The objects, comprising the graphic image for form type definition, are identified on the form image. The matching model is selected via identification of the said graphic image. In the case of multiple identification result, the profound analysis of the form type is performed. The profound analysis comprises creation of a new special model for form type identification containing primary special model plus one or more supplementary form objects. The image is performed a supplementary identification using new special model.

The profound analysis may be performed fully or partly automatically.

One or more form object, comprising the graphic image is described in a form of alternative.

Thus, the invention discloses methods of machine-readable form re-recognition analysis. In one embodiment, the method comprises:
  preliminarily assigning at least one form object as a graphic image for identification of a spatial orientation of a form,
  preliminarily creating at least one spatial orientation model of the said graphic image for identification of the spatial orientation of the form,
  parsing a form image into regions,
  determining the spatial orientation of the form image, comprising:
    (a) detecting on the form image at least one of said graphic images for identification of the spatial orientation of the form;
    (b) determining the spatial orientation of the form image based on a comparison of the detected graphic image with the spatial orientation model,
    (c) rotating the form image by 90"; and repeating step (b) in the case of said comparison between the detected graphic image and the spatial orientation model yielding a match that is below a predetermined level.

REFERENCES CITED NON-PATENT DOCUMENTS

1. "Proceedings of the 13-th International Conference on Pattern Recognition, Aug. 25-29, 1996, Vienna, Austria". Vol. III, Track C, IEEE Computer Society Press, Los Alamitos, Calif., p. 681-685.
2. 1. "Proceedings of the 13-th International Conference on Pattern Recognition, Aug. 25-29, 1996, Vienna, Austria". Vol. III, Track C, IEEE Computer Society Press, Los Alamitos, Calif., p. 691-695.
3. "Proceedings of the 13-th International Conference on Pattern Recognition, Aug. 25-29, 1996, Vienna, Austria". Vol. III, Track C, IEEE Computer Society Press, Los Alamitos, Calif., p. 696-700.
4. "Proceedings of the 13-th International Conference on Pattern Recognition, Aug. 25-29, 1996, Vienna, Austria". Vol. III, Track C, IEEE Computer Society Press, Los Alamitos, Calif., p. 701-705.
5. "Proceedings of the 13-th International Conference on Pattern Recognition, Aug. 25-29, 1996, Vienna, Austria". Vol. III, Track C, IEEE Computer Society Press, Los Alamitos, Calif., p. 768-772.
6. "Proceedings of the 13-th International Conference on Pattern Recognition, Aug. 25-29, 1996, Vienna, Austria". Vol. III, Track C, IEEE Computer Society Press, Los Alamitos, Calif., p. 793-797.

We claim:

1. A method for a machine to perform machine-readable form analysis comprising
  preliminarily assigning at least one form object as a graphic image for identification of a spatial orientation of a form during pre-recognition analysis, wherein the at least one form object assigned as a graphic image comprises a non-text image;
  preliminarily creating at least one spatial orientation model of the said graphic image for identification of the spatial orientation of the form during pre-recognition analysis;
  determining the spatial orientation of a form image, comprising:
    (a) detecting on the form image at least one of said graphic images for identification of the spatial orientation of the form;
    (b) determining the spatial orientation of the form image based on a comparison of the detected graphic image with the spatial orientation model;
    (c) rotating the form image by 90°; and repeating step (b), in case of said comparison between the detected graphic image and the spatial orientation model yielding a match that is below a predetermined level.

2. The method as recited in claim 1, wherein determining the spatial orientation comprises setting up and examining hypotheses and corresponding matching reliability estimations.

3. The method as recited in claim 1, wherein the at least one form object assigned as a graphic image comprises a text image.

4. The method as recited in claim 3, wherein text in said text image is additionally recognized as a first step in the pre-recognition analysis.

5. The method as recited in claim 4, wherein the recognized text is used as supplementary data in a form type definition process.

6. The method as recited in claim 1, wherein assigning comprises assigning a group of graphic images.

7. The method as recited in claim 1, wherein at least one form object comprises an element of empty region type.

8. The method as recited in claim 1, wherein at least one form object is of dividing line type.

9. The method as recited in claim 6, wherein the entire group of graphic images is used for determining the spatial orientation.

10. The method as recited in claim 1, wherein the said spatial orientation model is stored in a form model description.

11. The method as recited in claim 1, wherein the form image is parsed into the regions containing at least one of text objects images, data input fields, special reference points, and lines.

* * * * *